May 29, 1956 — R. J. GAUDREAU — 2,747,784
CONTAINERS
Filed Aug. 9, 1954
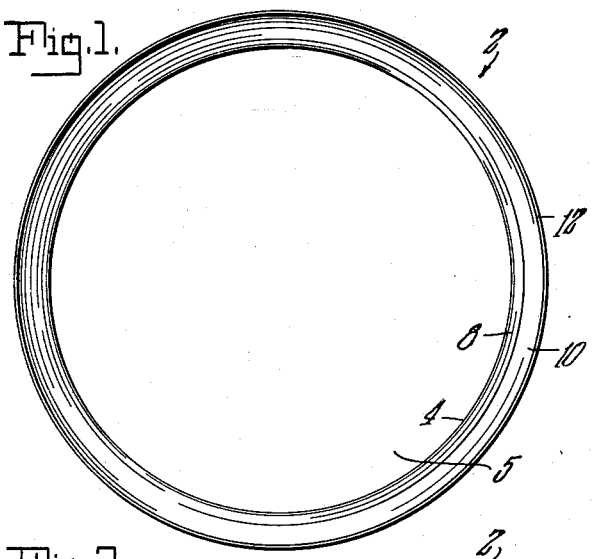
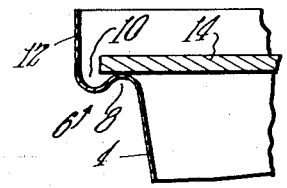
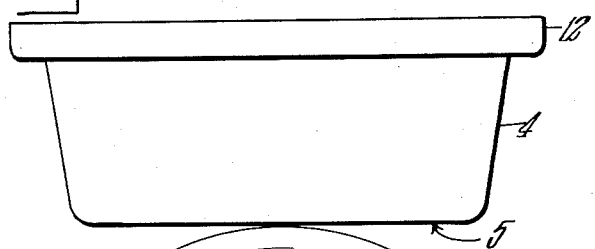
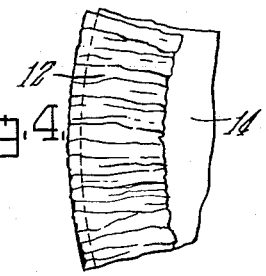
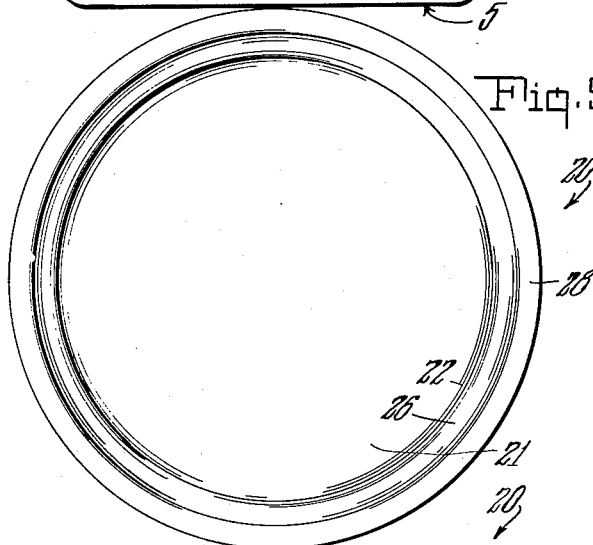
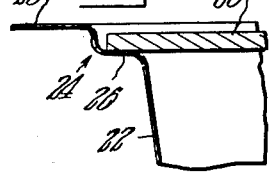
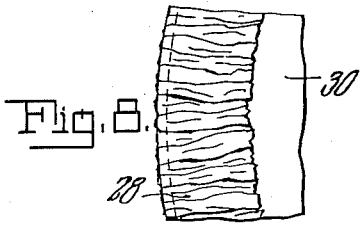
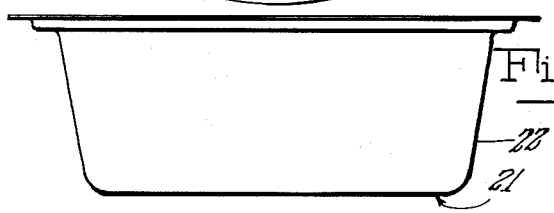
INVENTOR.
Richard J. Gaudreau
BY
Ross & Ross
Attys & Agent United States Patent Office 2,747,784
Patented May 29, 1956

2,747,784
CONTAINERS
Richard J. Gaudreau, Longmeadow, Mass., assignor to Standard Foil Products Corp., Springfield, Mass., a corporation of Massachusetts Application August 9, 1954, Serial No. 448,438

1 Claim. (Cl. 229—2.5)

This invention relates to improvements in containers.

The principal objects of the invention are the provision of a container for the storage, shipment and sale of foods which is economical to produce so that it may be discarded after use.

According to novel features of the invention, the container is formed from aluminum foil of a few thousandths in thickness for the sake of lightness and economy and is arranged to support a cover or closure of inexpensive material. Peripheral portions of the container are easily and readily brought over onto the closure when the container is filled so as to completely enclose the contents. When the contents are to be used, the marginal portions of the container are easily manipulated to facilitate removal of the cover and contents of the receptacle.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Figs. 1 and 2 are plan and elevational views of a container embodying the novel features of the invention;

Fig. 3 is an enlarged sectional view through an edge portion of the container shown in Figs. 1 and 2;

Fig. 4 is a partial plan view of the peripheral portion of the container bent over in closing position onto a cover; and Figs. 5, 6, 7 and 8 are views similar to Figs. 1, 2, 3 and 4 to show another form of the invention.

Referring now to the drawings more in detail, the invention will be fully described.

It will be understood that while round containers are shown and described, the novel features of the invention are applicable to containers of other shapes and various sizes.

A container 2 shown in Figs. 1 and 2 has inclined sides 4 and a bottom 5 so as to be dish-shaped for stacking purposes.

The container is formed from aluminum foil of a few thousandths in thickness.

A rim portion 6 extends outwardly from the side wall of the container and is in the form of a reverse curve or S as shown in Fig. 3 to provide an inner ledge 8 and an outer groove 10.

An annular flange 12 extends upwardly vertically from the outer groove which will be arranged for stacking of the receptacles.

The ledge 8 is adapted to support a cover or closure 14 which may be formed from inexpensive material such as cardboard that may be treated or coated with food preserving or protective material as may be desired.

The closure may be formed from transparent material such as plastic of the type best adapted for use with foods so that the food in the container will be visible.

The formation of the rim portion 6 is adapted to facilitate the easy and ready displacement of the flange inwardly over onto the closure 14. That is the groove 10 of the rim functions to provide a fullness of material so that the flange may snugly embrace the periphery of the closure as it is turned over and inwardly thereonto.

The flange 12 may be pressed snugly onto the closure as shown in Fig. 4 so as to provide a tight protective package for the contents of the container.

The receptacle 20 of Figs. 5 and 6 has an inclined side wall 22 and a bottom wall 21 as in the former case. An annular rim has a ledge 24 and a flange 28 disposed in a horizontal plane above that of the ledge. The ledge 24 is adapted for supporting a cover or closure 30 which may be similar to the cover 14.

In this form of the invention, the stepped arrangement facilitates a fullness of material which makes it an easy matter to turn the flange over onto the cover in a snug manner as in the former case.

In any event, the flange provides a means for adequately sealing the container and cover and is easily turned upwardly for release of the cover for access of the contents of the container. The containers may be stacked for shipment and other purposes and the closed containers may be stacked if desired.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A discardable container for foods comprising in combination, a receptacle formed from aluminum foil a few thousandths in thickness and a closure therefor, said receptacle including a horizontal bottom wall having a side wall diverging upwardly from said bottom wall and terminating in a rim portion, said rim portion curving upwardly and outwardly from the upper edge of said side wall forming an annular ledge for a closure and then downwardly and outwardly and upwardly and outwardly forming an annular groove around and in a plane below the plane of said ledge and terminating in a vertically disposed flange, said closure being flat and, resting on said ledge having a peripheral edge disposed inwardly from said flange and over said groove, and said flange adapted to be displaced inwardly over onto the peripheral portion of said closure.

References Cited in the file of this patent

UNITED STATES PATENTS

| 1,208,240 | Ullrich | Dec. 12, 1916 |
| 1,766,226 | Nias et al. | June 24, 1930 |
| 2,126,185 | Friedl | Aug. 9, 1938 |
| 2,550,815 | Inwood | May 1, 1951 |
| 2,673,806 | Colman | Mar. 30, 1954 |

FOREIGN PATENTS

| 787 | Great Britain | 1901 |
| 8,163 | Great Britain | 1901 |